US012762478B2

(12) United States Patent
Choi et al.

(10) Patent No.: US 12,762,478 B2
(45) Date of Patent: Oct. 13, 2026

(54) METHOD OF GENERALIZED BALANCED FEW-SHOT LEARNING USING ONLY NOVEL DATA WITHOUT OLD DATA

(71) Applicant: Inha University Research and Business Foundation, Incheon (KR)

(72) Inventors: Dongwan Choi, Incheon (KR); Seong Woong Kim, Incheon (KR)

(73) Assignee: Inha University Research and Business Foundation, Incheon (KR)

( * ) Notice: Subject to any disclaimer, the term of this patent is extended or adjusted under 35 U.S.C. 154(b) by 637 days.

(21) Appl. No.: 18/356,572

(22) Filed: Jul. 21, 2023

(65) Prior Publication Data

US 2024/0135250 A1 Apr. 25, 2024

(30) Foreign Application Priority Data

Oct. 14, 2022 (KR) ........................ 10-2022-0132146

(51) Int. Cl.
*G06N 3/08* (2023.01)
*G06N 20/00* (2019.01)

(52) U.S. Cl.
CPC ............... *G06N 20/00* (2019.01); *G06N 3/08* (2013.01)

(58) Field of Classification Search
CPC ............................... G06N 3/096; G06N 20/00
See application file for complete search history.

(56) References Cited

U.S. PATENT DOCUMENTS

2020/0175384 A1* 6/2020 Zhang .................... G06N 3/082
2023/0088669 A1* 3/2023 Bingham ............... G06N 3/044
706/18

OTHER PUBLICATIONS

Yang, Shuo, Lu Liu, and Min Xu. "Free lunch for few-shot learning: Distribution calibration." arXiv preprint arXiv:2101.06395 (2021). (Year: 2021).*

Chen, Kuilin, and Chi-Guhn Lee. "Meta-free few-shot learning via representation learning with weight averaging." 2022 International Joint Conference on Neural Networks (IJCNN). IEEE, 2022. (Year: 2022).*

Huang, Lei, et al. "Centered weight normalization in accelerating training of deep neural networks." Proceedings of the IEEE International Conference on Computer Vision. 2017 (Year: 2017).*

* cited by examiner

*Primary Examiner* — Hal Schnee
(74) *Attorney, Agent, or Firm* — Hoffman Warnick LLC

(57) ABSTRACT

A method and system of generalized balanced few-shot learning using only novel data without old data is proposed. The method of generalized balanced few-shot learning using only novel data without old data proposed in the present disclosure includes pre-training stage for training a feature extractor and a classifier of a training model with base data through a pre-training unit and fine-tuning stage for freezing the feature extractor through a fine-tuning unit, training a joint linear classifier capable of inferring base classes and novel classes, and performing weight normalization to achieve zero-mean and balanced variance.

6 Claims, 5 Drawing Sheets

METHOD OF GENERALIZED BALANCED FEW-SHOT LEARNING USING ONLY NOVEL DATA WITHOUT OLD DATA

CROSS-REFERENCE TO RELATED APPLICATION

This application claims the priority benefit of Korean Patent Application No. 10-2022-0132146, filed on Oct. 14, 2022, in the Korean Intellectual Property Office, the disclosure of which is incorporated herein by reference.

This work was supported in part by Institute of Information & Communications Technology Planning & Evaluation (IITP) grants funded by the Korea government (MSIT) (No. 2022-0-00448, Deep Total Recall: Continual Learning for Human-Like Recall of Artificial Neural Networks (50%), No. RS2022-00155915, Artificial Intelligence Convergence Innovation Human Resources Development (Inha University) (10%)), and in part by the National Research Foundation of Korea (NRF) grants funded by the Korea government (MSIT) (No. 2021R1F1A1060160 (30%), No. 2022R1A4A3029480 (10%)).

BACKGROUND

1. Field of the Invention

The present disclosure relates to method and system of generalized balanced few-shot learning using only novel data without old data.

2. Description of the Related Art

Few-shot learning is one of fields in which active research is being conducted. The few-shot learning aims for learning quickly adaptable to novel classes having a few data by utilizing knowledge learned with a lot of existing data. Recently, the few-shot learning is divided into meta learning and transfer learning. The meta learning uses an episodic way where base data is divided into tasks having N classes and K images. Unlike the meta learning, which requires a complex method, the transfer learning simply re-uses a feature extractor learned from base data. The transfer learning achieves a good performance with only fine-tuning a classifier with data of novel classes. Although the transfer learning is used as an effective method in the few-shot learning, its performance is unsatisfactory in generalized few-shot learning without additional leaning method.

The generalized few-shot learning aims to quickly adapt to novel classes but also preserve knowledge of base classes. A dominant approach in the generalized few-shot learning learns by adding some architecture, not changing a pre-trained model with base data. The additional architecture allows of balanced inference between base classes and novel classes by pre-generating parameters of a novel classifier or properly modifying output of the pre-trained model.

In the prior art, relationship of the novel classes and the base classes is learned by adding semantic information along with additional architecture. Another approach is a balanced fine-tuning, and it fine-tunes a pre-trained model with a balanced dataset of novel classes and base classes without using additional architecture. For additional performance improvement in the fine-tuning, another prior art uses weight imprinting which initializes average feature vectors of novel data with weight of a novel classifier. Another prior art introduces a three-step framework in which a configuration of data is different for each stage. Another prior art makes a balanced dataset through hallucination method for making synthetic novel data based on base data.

SUMMARY

The technical problem to be achieved by the present disclosure is to provide method and system for newly incorporating knowledge of a few data of novel classes into a pre-trained model without any data of base classes. Through the proposed few-shot learning technique, it can be used in situations where base data is not available due to privacy or ethical issues, and it provides performance improvement in both of novel classes and base classes by controlling mean and variance of weight distribution of the novel classes.

According to one aspect, a method of generalized balanced few-shot learning using only novel data without old data proposed in the present disclosure includes pre-training stage for training a feature extractor and a classifier of a training model with base data through a pre-training unit and fine-tuning stage for freezing the feature extractor through a fine-tuning unit, training a joint linear classifier capable of inferring base classes and novel classes, and performing weight normalization to achieve zero-mean and balanced variance.

The fine-tuning stage for freezing the feature extractor through the fine-tuning unit, training the joint linear classifier capable of inferring the base classes and the novel classes, and performing weight normalization to achieve zero-mean and balanced variance comprises performing normalization during training process to keep weight mean of a novel classifier at zero, after completing the fine-tuning, adjusting weights of a base classifier to match the ratio of standard deviations, and optimizing decision boundaries of novel classes by using class-wise learnable parameters.

The fine-tuning stage for freezing the feature extractor through the fine-tuning unit, training the joint linear classifier capable of inferring the base classes and the novel classes, and performing weight normalization to achieve zero-mean and balanced variance newly incorporates knowledge for training data of the novel classes into a pre-trained model without data of the base classes by controlling mean and variance of weight of the novel classes.

After completing the fine-tuning, the adjusting weights of the base classifier to match the ratio of standard deviations readjusts size of weight of the base classifier by multiplying the ratio of the standard deviation of the novel classifier and the base classifier to the base classifier.

According to another aspect, a system of generalized balanced few-shot learning using only novel data without old data proposed in the present disclosure includes a pre-training unit for training a feature extractor and a classifier of a training model with base data, and a fine-tuning unit for freezing the feature extractor, training a joint linear classifier capable of inferring base classes and novel classes, and performing weight normalization to achieve zero-mean and balanced variance.

According to example embodiments of the present disclosure, knowledge for a few data of novel classes may be newly incorporated into a pre-trained model without data of base classes. Also, through the proposed few-shot learning technique, it can be used in situations where base data is not available due to privacy or ethical issues, and it can improve performance in both of novel classes and base classes by controlling mean and variance of weight distribution of the novel classes.

BRIEF DESCRIPTION OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Figure 1:
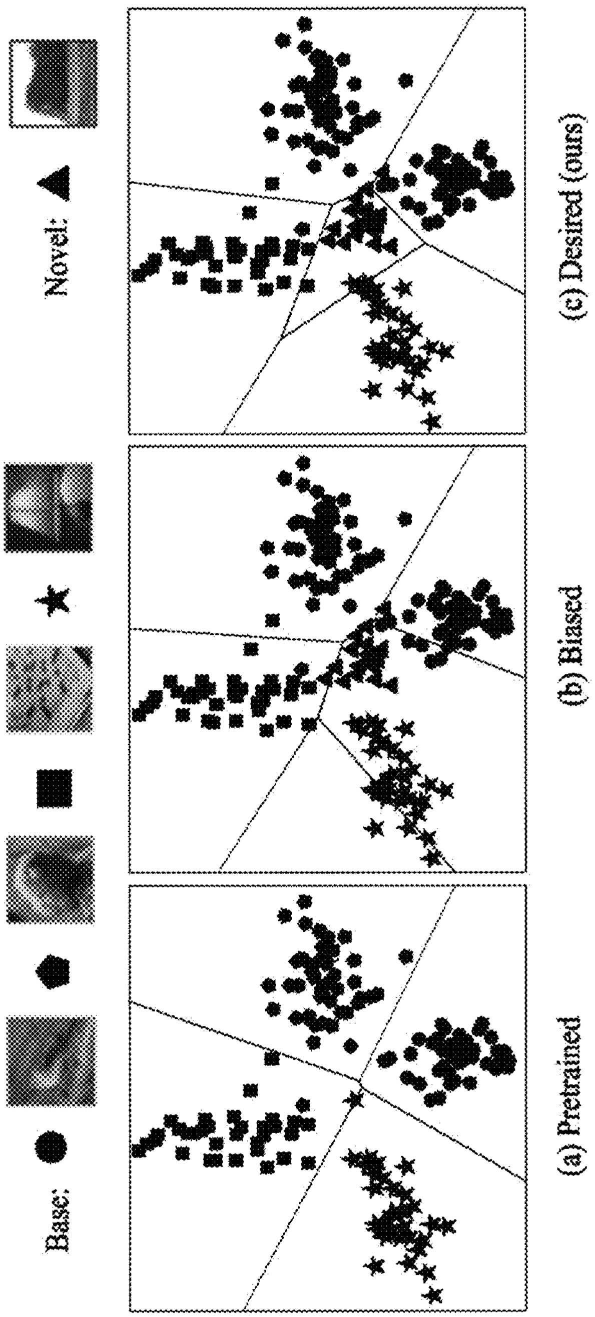
FIG. 1 is a schematic diagram for describing a few-shot learning technique according to one example embodiment of the present disclosure.

The present disclosure proposes a method for newly incorporating knowledge of a few data of novel classes into a pre-trained model without any data of base classes. Unlike the existing generalized few-shot learning that requires base data, the method proposed in the present disclosure may be used in situations where base data is not available due to privacy or ethical issues.

The present disclosure discovers the fact that mean and variance of weight distribution of novel classes are not properly established, compared to mean and variance of weight distribution of base classes. Furthermore, the existing method attempts to make weight norms balanced, which helps only the variance part, but discards the importance of mean, leading to the limited performance. To overcome this limitation, the present disclosure achieves a satisfactory performance on both novel classes and base classes by controlling mean and variance of the weight distribution of novel classes. Also, it was confirmed that the method proposed in the present disclosure that does not utilize any base data even outperforms the existing method that makes the best use of base data. It was confirmed that through a normalization method proposed in the present disclosure, transfer learning is effective in generalized few-shot learning even without using any base data. Hereinafter, embodiments of the present disclosure are described in detail with reference to the accompanying drawings.

The term, model, according to one example embodiment of the present disclosure means a deep neural network.

The term, base classes, according to one example embodiment of the present disclosure means classes already trained in a model, and it has training data sufficient for the model to learn.

The term, base data, according to one example embodiment of the present disclosure means data of base classes.

The term, novel classes, according to one example embodiment of the present disclosure means new classes that a model has not seen before, and it has a few data as training data and has fewer classes than the base classes.

The term, novel data, according to one example embodiment of the present disclosure means data of novel classes.

The term, classifier, according to one example embodiment of the present disclosure means a linear model for determining to which classes data belongs, and it determines based on linear combination of weights of the classifier and feature vectors.

The term, base classifier, according to one example embodiment of the present disclosure means a classifier of base classes.

The term, novel classifier, according to one example embodiment of the present disclosure means a classifier of novel classes.

The term, feature extractor, according to one example embodiment of the present disclosure is composed of a convolutional neural network, and it means a model embedding high-dimensional data into low-dimensional data.

The term, few-shot learning, according to one example embodiment of the present disclosure aims for a model to learn new classes using only few data and to infer, and it uses generally 10 or less data.

The term, generalized few-shot learning, according to one example embodiment of the present disclosure aims for a model not only to learn new classes with few data, but also to infer the existing classes trained with a lot of data.

FIG. 1 is a schematic diagram for describing a few-shot learning technique according to one example embodiment of the present disclosure.

A generalized few-shot learning in the prior art always requires base data in a process for preserving the existing knowledge such as learning additional architecture or performing balanced fine-tuning. The present disclosure intends to perform generalized few-shot learning without base data by using new weight distribution. If a pre-trained model (FIG. 1 (*a*)) is fine-tuned without base data, the model is strongly biased toward novel classes even if freezing a feature extractor of the model. As FIG. 1 (*b*), decision boundaries of the novel classes are formed unnecessarily large, so base data may be misclassified as novel classes. To form balanced decision boundaries for normalizing weights of a classifier in the prior art, a cosine classifier which is basic weight normalization is used. However, when such normalization is used without base data, inference performance for base classes is rather significantly reduced.

As a result of analysis on weight distribution of a classifier forming decision boundary, the present disclosure tries to solve two problems in terms of mean and variance. One is the problem that there is an imbalance between the variances of weight distributions of novel classes and base classes. It is confirmed that the existing weight normalization considers only variance of weigh distribution. Another one is the problem that the mean of the novel classes is positively shifted from that of the base classes. It is confirmed that such mean shifting phenomenon is major cause of a biased model, and to solve this, the present disclosure proposes a weight normalization method for balanced variance and zero-mean. Based on the proposed method, a decision boundary may be formed without base data as FIG. 1 (*c*), and through this, it tries to achieve balanced performances of novel classes and base classes.

Figure 2:
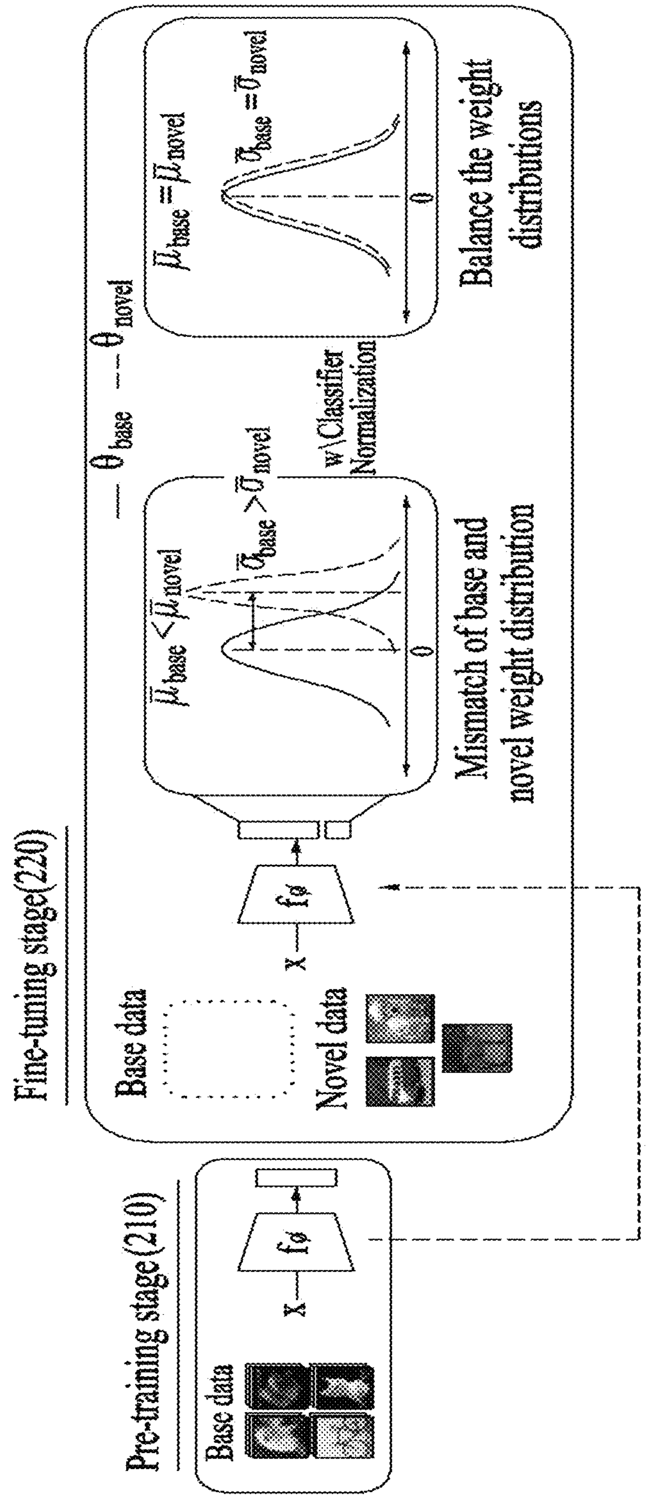
FIG. 2 is a flow chart for describing a method of generalized few-shot learning according to one example embodiment of the present disclosure.

FIG. 2 is a flow chart for describing a method of generalized few-shot learning according to one example embodiment of the present disclosure.

The proposed method of generalized few-shot learning includes pre-training stage 210 for training a feature extractor and a classifier of a training model with base data through a pre-training unit, and fine-tuning stage 220 for freezing the feature extractor through a fine-tuning unit, training a joint linear classifier capable of inferring base classes and novel classes, and performing weight normalization to achieve zero-mean and balanced variance.

In the stage 210, pre-training for training the feature extractor and the classifier of the training model with base data through the pre-training unit is performed.

In the stage 220, fine-tuning for freezing the feature extractor through the fine-tuning unit, training the joint linear classifier capable of interring base classes and novel classes, and performing weight normalization to achieve zero-mean and balanced variance is performed. Learning data in the fine-tuning stage uses only a few novel data without base data. The weight normalization method proposed in the present disclosure is applied on the fine-tuning stage.

In the fine-tuning stage, knowledge for learning data of the novel classes may be newly incorporated into a pre-trained model without data of the base classes by controlling mean and variance of weights of the novel classes.

In the fine-tuning stage, first, online mean centering is performed.

To keep the weight mean of a novel classifier at zero, the following normalization is applied in the process of training.

$$\hat{\theta}_{novel}=\theta_{novel}-\mu_{novel}$$

Here, $\theta_{novel}$ is the novel classifier, and $\mu_{novel}$ is a mean vector of class-wise weight. When fine-tuning the joint classifier, online mean centering is applied on only the novel classifier. This directly reduces the positive weights of the novel classifier and keeps zero-mean while learning features of novel classes. It does not give any constraints to the variance of weights during fine-tuning, and it allows each classifier learn as many required features as possible.

Next, offline variance balancing is performed.

After completing the fine-tuning, the weights of the base classifier are adjusted to match the ratio of standard deviations as follow equation.

$$\hat{\theta}_{base} = \frac{\overline{\sigma}_{novel}}{\sigma_{base}} \cdot \theta_{base}$$

Here, $\overline{\sigma}_{novel}$ is the average of class-wise standard deviations for all novel classes. The present disclosure re-scales size of weight of the base classifier by multiplying the ratio of the standard deviations of the novel classifier and the base classifier to the base classifier. Through this, the weight variance of the base classifier gets similar to that of novel classifier.

Finally, post linear optimization is performed.

At this time, decision boundaries of the novel classes are optimized by using class-wise learnable parameters.

The present disclosure introduces class-wise learnable parameters $\gamma_i$ and $\beta_i$ for class $i \in C_{base} \cup C_{novel}$. $\theta=\{\theta_{baes}, \theta_{novel}\}$ is frozen, and $\gamma_i$ and $\beta_i$ are trained with novel data. $\gamma \cdot \theta^T f_\phi(x)+\beta$ is applied at inference. The present disclosure may further improve the performance of novel classes particularly in an extreme case of 1-shot learning.

Figure 3:
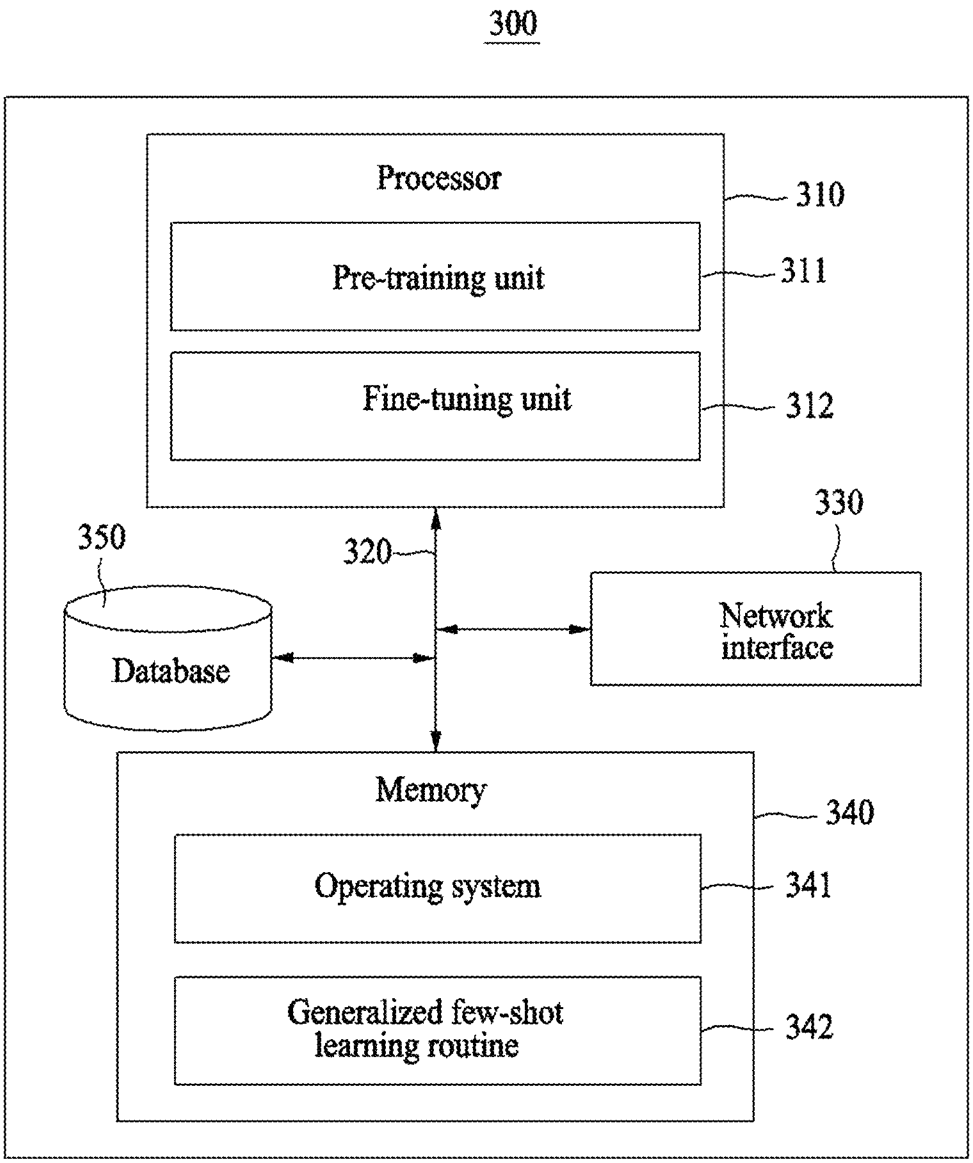
FIG. 3 is a drawing illustrating a configuration of a system of generalized few-shot learning according to one example embodiment of the present disclosure.

FIG. 3 is a drawing illustrating a configuration of a system of generalized few-shot learning according to one example embodiment of the present disclosure.

A system of generalized few-shot learning according to the example embodiments 300 may include a processor 310, a bus 320, and a network interface 330, a memory 340, and a database 350. The memory 340 may include an operating system (OS) 341 and a generalized few-shot learning routine 342. The processor 310 may include a pre-training unit 311 and a fine-tuning unit 312. The system of generalized few-shot learning 300 in other example embodiments may include more components than components in FIG. 3. However, there is no need to clearly illustrate most of conventional components. For example, the system of generalized few-shot learning 300 may include other components such as a display or a transceiver.

The memory 340 includes a permanent mass storage device such as RAM (random access memory), ROM (read only memory), and disk drive as computer-readable recording medium. Also, in the memory 340, a program code for the OS 341 and the generalized few-shot learning routine 342 may be stored. Such software components may be loaded from another computer-readable medium separate from the memory 340 by using a drive mechanism (not shown). Such separate computer-readable recording medium may include computer-readable medium (not shown) such as a floppy drive, a disc, a tape, a DVD/CD-ROM drive, a memory card, and the like. In other example embodiments, software components may be loaded to the memory 340 through the network interface 330, not through the computer-readable medium.

The bus 320 enables communication and data transmission between components of the system of generalized few-shot learning 300. The bus 320 may be configured by using a high-speed serial bus, a parallel bus, a SAN (Storage Area Network) and/or other appropriate communication technologies.

The network interface 330 may be a computer hardware component for connecting the system of generalized few-shot learning 300 to a computer network. The network interface 330 may connect the system of generalized few-shot learning 300 to a computer network through wireless or wired connection.

The database 350 may serve to store and maintain all information required for generalized few-shot learning. Although FIG. 3 illustrates that the database 350 is constructed and included inside the system of generalized few-shot learning system 300, it is not limited thereto, and it may be omitted according to system implementation methods or environments or it is also possible that all or part of the database exists as an external database constructed on a separate system.

The processor 310 may be configured to process computer program instructions by performing basic arithmetic, logic, and input/output operation of the system of generalized few-shot learning 300. The instructions may be provided to the processor 310 by the memory 340 or the network interface 330, and through the bus 320. The processor 310 may be configured to execute a program code for the pre-training learning unit 311 and the fine-tuning unit 312. Such program code may be stored in a storage device such as the memory 340.

The pre-training learning unit 311 and the fine-tuning unit 312 may be configured to perform stages 110~120 in FIG. 1.

The system of generalized few-shot learning 300 may include the pre-training unit 311 and the fine-tuning unit 312.

The pre-training unit 311 trains a feature extractor and a classifier of a training model with base data.

The fine-tuning unit 312 freezes the feature extractor, trains a joint linear classifier capable of inferring base classes and novel classes, and performs weight normalization to achieve zero-mean and balanced variance.

The fine-tuning unit 312 includes the joint linear classifier including a novel classifier and a base classifier, first performs normalization during training process to keep weight mean of the novel classifier at zero. After completing the fine-tuning, weights of the base classifier are adjusted to match the ratio of standard deviations. Finally, decision boundaries of novel classes are optimized by using class-wise learnable parameters Tables 1 to 3 are results for total six datasets for the method of generalized few-shot learning in the prior art and for the method of generalized few-shot learning without base data through the weight normalization proposed in the present disclosure. The performance of experiment is the result of average accuracy of novel classes, base classes, and all classes according to shots of the novel data. According to the experimental results, it may be confirmed that the proposed method shows higher average performance in various data and models than other comparative experimental groups using base data.

TABLE 1

| | 1-shot | | | 5-shot | | | 10-shot | | |
|---|---|---|---|---|---|---|---|---|---|
| Methods/Shots | Novel | Base | All | Novel | Base | All | Novel | Base | All |
| GcGPN (Shi et al. 2020) | 39.86 | 54.65 | 47.25 | 56.32 | 59.30 | 57.81 | — | — | — |
| IW (Qi, Brown, and Lowe 2018) | 41.32 | 58.04 | 49.68 | 59.27 | 58.68 | 58.98 | 45.85 | 72.53 | 59.19 ± 0.19 |
| DFSL (Gidaris and Komodakis 2018) | 31.25 | 17.72 | 39.49 | 46.96 | 58.92 | 52.94 | 66.04 | 69.87 | 67.95 ± 0.17 |
| AAN (Ren et al. 2019) | 45.61 | 63.92 | 54.76 | 60.82 | 64.14 | 62.48 | 66.33 | 62.49 | 64.41 ± 0.16 |
| LCwoF (Kukleva, Kuehne, and Schiele 2021) | 53.78 | 62.89 | 57.84 | 68.58 | 64.53 | 66.55 | 76.71 ± 0.58 | 62.86 ± 0.07 | 69.78 ± 0.28 |
| XtarNet (Yoon et al. 2020) | 47.04 ± 0.29 | 64.17 ± 0.22 | 55.61 ± 0.17 | 62.46 ± 0.23 | 70.57 ± 0.20 | 66.52 ± 0.16 | 70.46 ± 0.23 | 70.88 ± 0.21 | 70.67 ± 0.15 |
| MVCN (ours) | 51.72 ± 0.64 | 65.81 ± 0.08 | 58.77 ± 0.35 | 73.20 ± 0.46 | 67.62 ± 0.09 | 71.22 ± 0.26 | 78.7 ± 0.31 | 63.06 ± 0.09 | 73.38 ± 0.25 |

TABLE 2

| | 1-shot | | | 5-shot | | | 10-shot | | |
|---|---|---|---|---|---|---|---|---|---|
| Methods/Shots | Novel | Base | All | Novel | Base | All | Novel | Base | All |
| IW (Qi, Brown, and Lowe 2018) | 44.95 | 62.53 | 53.74 | 71.85 | 56.11 | 63.98 | 74.01 | 61.67 | 65.50 ± 0.16 |
| DFSL (Gidaris and Komodakis 2018) | 47.32 | 30.10 | 41.71 | 67.94 | 39.08 | 53.51 | 73.97 | 56.94 | 65.46 ± 0.17 |
| AAN (Ren et al. 2019) | 54.39 | 35.85 | 55.12 | 57.76 | 64.13 | 60.95 | 70.88 | 57.46 | 64.18 ± 0.17 |
| LCwoF (Kukleva, Kuehne, and Schiele 2021) | 57.13 | 60.39 | 58.76 | 69.05 | 63.44 | 66.25 | 79.20 ± 0.72 | 61.76 ± 0.10 | 70.57 ± 0.41 |
| XtarNet (Yoon et al. 2020) | 58.90 ± 0.29 | 64.02 ± 0.22 | 61.46 ± 0.18 | 74.49 ± 0.24 | 63.13 ± 0.21 | 68.81 ± 0.16 | 78.36 ± 0.23 | 63.08 ± 0.22 | 70.72 ± 0.16 |
| MVCN (ours) | 62.11 ± 0.70 | 61.23 ± 0.22 | 61.67 ± 0.31 | 79.59 ± 0.55 | 66.3 ± 0.20 | 72.34 ± 0.28 | 83.06 ± 0.56 | 67.46 ± 0.16 | 75.26 ± 0.27 |

TABLE 3

| Methods/Shots | 1-shot | 2-shot | 5-shot | 10-shot | 1-shot | 2-shot | 5-shot | 10-shot | 1-shot | 2-shot | 5-shot | 10-shot |
|---|---|---|---|---|---|---|---|---|---|---|---|---|
| ReViSE (Tsai, Huang, and Salakhutdinov 2017) | 36.3 | 41.1 | 44.6 | 50.9 | 56.1 | 60.3 | 64.1 | 67.8 | — | — | — | — |
| CA-VAE (Schönfeld et al. 2019) | 50.6 | 54.4 | 59.6 | 62.2 | 64.0 | 71.3 | 76.6 | 79.0 | 41.8 | 52.7 | 66.5 | 76.7 |
| DA-VAE (Schönfeld et al. 2019) | 49.2 | 54.6 | 58.8 | 60.8 | 68.0 | 73.0 | 75.6 | 76.8 | 68.6 | 77.1 | 81.8 | 81.3 |
| CADA-VAE (Schönfeld et al. 2019) | 55.2 | 59.2 | 63.0 | 64.9 | 69.6 | 73.7 | 78.1 | 80.2 | 73.6 | 78.9 | 81.9 | 85.0 |

TABLE 3-continued

| Methods/Shots | 1-shot | 2-shot | 5-shot | 10-shot | 1-shot | 2-shot | 5-shot | 10-shot | 1-shot | 2-shot | 5-shot | 10-shot |
|---|---|---|---|---|---|---|---|---|---|---|---|---|
| DRAGON (Samuel, Atzmon, and Chechik 2021) | 55.3 | 59.2 | 63.5 | 67.8 | 67.1 | 69.1 | 76.7 | 81.9 | — | — | — | — |
| MVCN (ours) | 57.3 | 61.6 | 65.4 | 67.8 | 69.9 | 76.4 | 81.2 | 82.2 | 77.1 | 83.5 | 87.4 | 87.7 |

Figure 4:
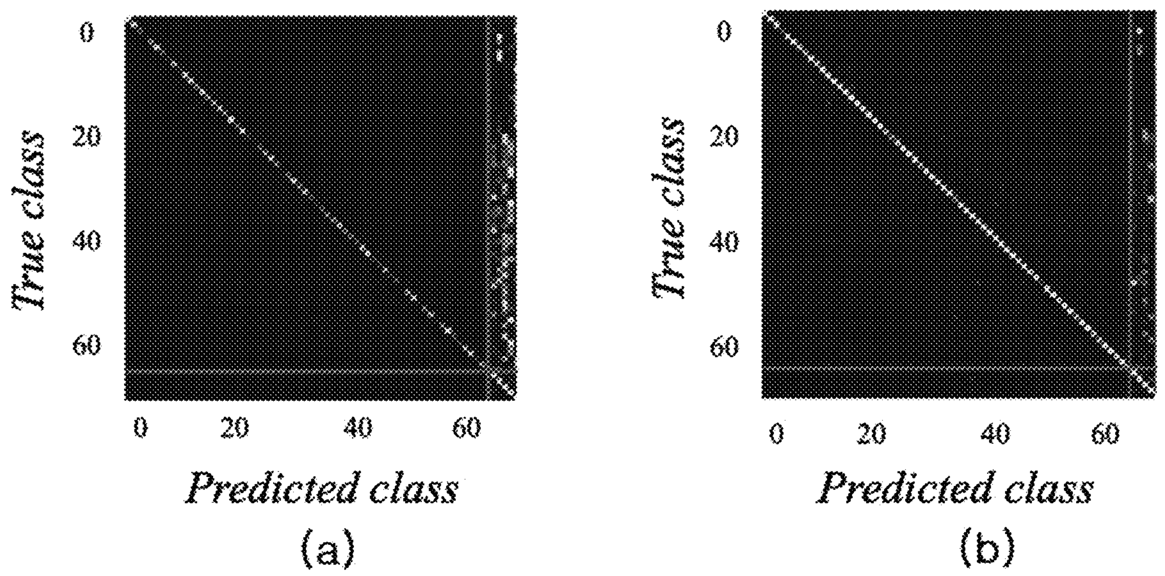
FIG. 4 is a drawing for comparing confusion matrices according to one example embodiment of the present disclosure with the prior art.

FIG. 4 is a drawing for comparing confusion matrices according to one example embodiment of the present disclosure with the prior art.

FIG. 4 shows confusion matrices for a result of applying the method proposed in the present disclosure (FIG. 4 (*b*) and a result of not applying the method (FIG. 4 (*a*)). As FIG. 4, it may be confirmed that a linear classifier without the normalization tends to erroneously classify base data as novel classes, but the case with the normalization does not. Such result shows that decision boundaries of novel classes get unnecessarily large in the existing fine-tuned classifier. However, it may be confirmed that the classifier applying the method proposed in the present disclosure does not confused about the novel classes and the base classes.

Figure 5:
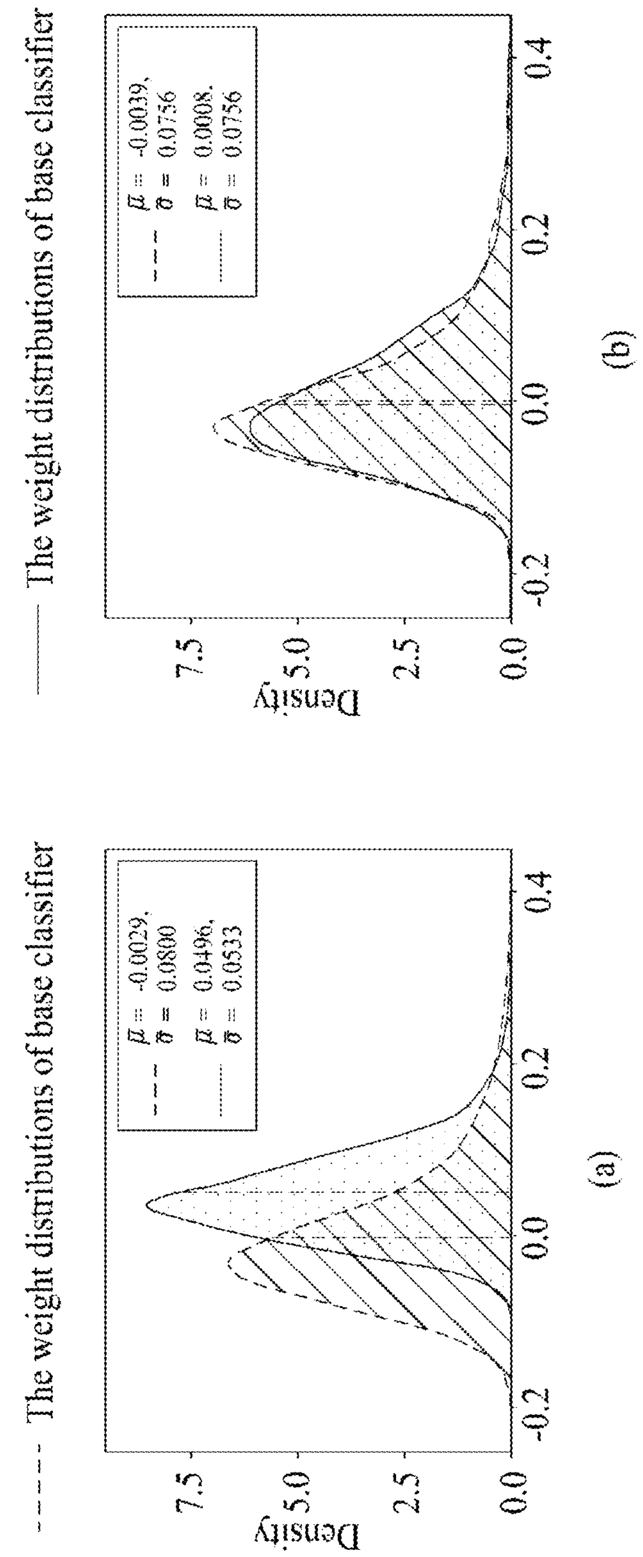
FIG. 5 is a drawing illustrating weight distributions of base classes and novel classes according to one example embodiment of the present embodiment.

FIG. 5 is a drawing illustrating weight distributions of base classes and novel classes according to one example embodiment of the present embodiment.

FIG. 5 shows weight distributions of base classes and novel classes when the method proposed in the present disclosure is applied (FIG. 5 (*b*)) and not applied (FIG. 5 (*a*)). It may be confirmed that the method proposed in the present disclosure resolves mean shifting phenomenon and achieves a balanced variance between base classes and novel cases through having $\mu_{novel}$ 62 times smaller than the existing classifier. Also, FIG. 5 may confirm that $\overline{\sigma}_{base}$ and $\overline{\sigma}_{novel}$ become almost the same after normalization, and it means that there is no bias toward either novel classes or base classes.

The aforementioned device may be implemented as a hardware component, a software component, and/or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, virtual equipment, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to an embodiment may be implemented in the form of a program instruction executable by various computer means and stored in a computer-readable medium. The computer-readable recording medium may include a program instruction, a data file, and a data structure solely or in combination. The program instruction recorded on the medium may be specially designed and constructed for an embodiment, or may be known and available to those skilled in the computer software field. Examples of the computer-readable recording medium include magnetic media such as a hard disk, a floppy disk and a magnetic tape, optical media such as CD-ROM and a DVD, magneto-optical media such as a floptical disk, and hardware devices specially configured to store and execute a program instruction, such as ROM, RAM, and a flash memory. Examples of the program instruction include a high-level language code executable by a computer by using an interpreter in addition to a machine-language code, such as that written by a compiler.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The invention claimed is:

1. A method of few-shot learning, comprising:

training a feature extractor and a classifier of a training model with base data through a pre-training unit in a pre-training stage; and freezing the feature extractor through a fine-tuning unit, training a joint linear classifier capable of inferring base classes and novel classes, and performing a weight normalization to achieve a zero-mean and balanced variance of the joint linear classifier in a fine-tuning stage, wherein the fine-tunning stage further comprises:

performing normalization during a training process to keep a weight mean of a novel classifier at zero;

adjusting weights of a base classifier to match a ratio of standard deviations after completing the fine-tuning stage, wherein the ratio of standard deviations includes the standard deviation of the novel classes and the base classes; and optimizing decision boundaries of the novel classes by using class-wise learnable parameters.

2. The method of few-shot learning of claim 1, wherein the fine-tuning stage for freezing the feature extractor through the fine-tuning unit, training the joint linear classifier capable of inferring the base classes and the novel classes, and performing weight normalization to achieve the zero-mean and balanced variance of the joint linear classifier newly incorporates knowledge for training data of the novel classes into a pre-trained model without data of the base classes by controlling a mean and variance of a weight of the novel classes by online mean centering.

3. The method of few-shot learning of claim 1, wherein after completing the fine-tuning stage, adjusting weights of the base classifier to match the ratio of standard deviations and readjusting a size of weight of the base classifier by multiplying the ratio of the standard deviation of the novel classes and the base classes to the weight of the base classifier.

4. A system of few-shot learning, comprising:

a pre-training unit for training a feature extractor and a classifier of a training model with base data; and a fine-tuning unit for freezing the feature extractor, training a joint linear classifier capable of inferring base classes and novel classes, and performing weight normalization to achieve zero-mean and balanced variance of the joint linear classifier, wherein the fine-tuning unit includes a novel classifier and a base classifier, performs normalization during a training process to keep a weight mean of the novel classifier at zero, after completing the fine-tuning, adjusts the weights of the base classifier to match a ratio of standard deviations, wherein the ratio of standard deviations include the standard deviation of the novel classes and the base classes, and optimizes decision boundaries of the novel classes by using class-wise learnable parameters.

5. The system of few-shot learning of claim 4, wherein the fine-tuning unit newly incorporates knowledge for training data of the novel classes into a pre-trained model without data of the base classes by controlling a mean and variance of a weight of the novel classes by online mean centering.

6. The system of few-shot learning of claim 4, wherein the fine-tuning unit readjusts a size of weight of the base classifier by multiplying the ratio of the standard deviation of the novel classes and the base classes to the weight of the base classifier.

* * * * *